US012779962B2

(12) United States Patent
Michailidis

(10) Patent No.: US 12,779,962 B2
(45) Date of Patent: Nov. 3, 2026

(54) COVER ASSEMBLY FOR TRUCK BED

(71) Applicant: GI.ANSO 4X4 CLUB, S.A., Elefsina-Attikis (GR)

(72) Inventor: Athinodoros Michailidis, Elefsina-Attikis (GR)

(73) Assignee: GI ANSO 4X4 CLUB SA, Elefsina (GR)

( * ) Notice: Subject to any disclaimer, the term of this patent is extended or adjusted under 35 U.S.C. 154(b) by 0 days.

(21) Appl. No.: 18/994,482

(22) PCT Filed: Jul. 5, 2023

(86) PCT No.: PCT/EP2023/068540
§ 371 (c)(1),
(2) Date: Jan. 14, 2025

(87) PCT Pub. No.: WO2024/012953
PCT Pub. Date: Jan. 18, 2024

(65) Prior Publication Data

US 2026/0034869 A1 Feb. 5, 2026

(30) Foreign Application Priority Data

Jul. 15, 2022 (EP) .................................... 22185152

(51) Int. Cl.
*B60J 7/06* (2006.01)
*B60R 16/023* (2006.01)

(52) U.S. Cl.
CPC ........... *B60J 7/068* (2013.01); *B60R 16/0231* (2013.01)

(58) Field of Classification Search
CPC ........... B60J 7/068; B60J 7/141; B60J 7/0573
USPC .................................................... 296/100.01
See application file for complete search history.

(56) References Cited

U.S. PATENT DOCUMENTS 3,092,170 A 6/1963 Ellis
4,563,034 A * 1/1986 Lamb ....................... B60J 7/068 160/266
4,611,848 A * 9/1986 Romano .................. B60J 7/068 296/100.09

(Continued)

FOREIGN PATENT DOCUMENTS

DE 10 2015 004859 A1 10/2016
FR 2824867 A1 11/2002
WO WO 90/02056 A1 3/1990

*Primary Examiner* — Hilary L Gutman
(74) *Attorney, Agent, or Firm* — Sisson & Banyas, Attorneys at Law, LLC; Jeffrey J. Banyas

(57) ABSTRACT

A cover assembly for a truck bed of a pick-up type vehicle has a cover assembly including a rollable curtain with transverse adjacent panels hingedly linked to one another, side rails mounted on upper portions of side walls of the truck bed for guiding end portions of the transverse adjacent panels, and a housing that receives and stores the rollable curtain. The side rails are mounted on upper portions of side walls of the truck bed for guiding end portions of the transverse adjacent panels. The housing has a transverse rotatable shaft configured to undergo rotational movement, at least one sleeve element mounted on the transverse rotatable shaft, an engagement element mounted to the at least one sleeve element and configured to engage an inner end of the rollable curtain, and inwardly extending continuous helical trackways defining a rolling path formed on respective sidewalls of the housing.

13 Claims, 6 Drawing Sheets

(56) References Cited

U.S. PATENT DOCUMENTS

| | | | | |
|---|---|---|---|---|
| 9,834,076 | B2 * | 12/2017 | Rohr | B60J 7/067 |
| 10,737,563 | B2 * | 8/2020 | Carter | B60J 7/068 |
| 12,466,246 | B2 * | 11/2025 | Mantovani | B60J 7/068 |
| 2026/0061808 | A1 * | 3/2026 | Ying | B60J 7/068 |

* cited by examiner

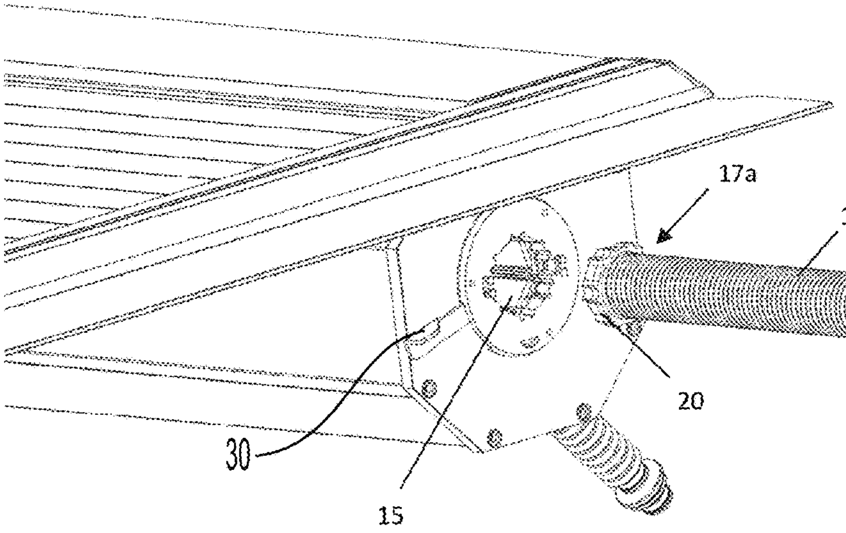
FIG. 6a
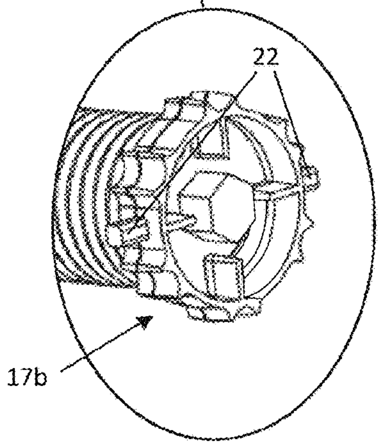
FIG. 6b
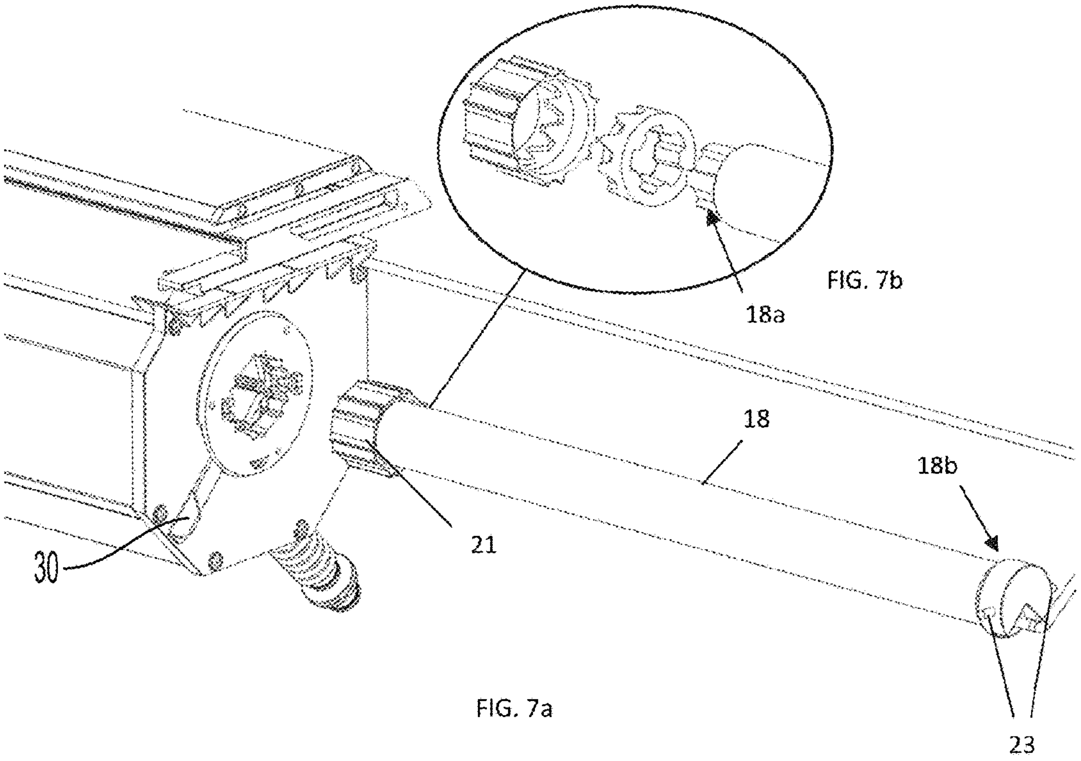
FIG. 7b
FIG. 7a

COVER ASSEMBLY FOR TRUCK BED

RELATED APPLICATIONS

This application is a national stage application under 35 U.S.C. § 371 of International Patent Application No. PCT/EP2023/068540, filed on Jul. 5, 2023 and published as WO 2024/012953 on Jan. 18, 2024, which claims priority to European Patent Application No. 22185152.0, filed Jul. 15, 2022, which are all hereby incorporated by reference in their entirety.

FIELD OF THE INVENTION

The invention relates to a cover assembly for the truck bed of a pick-up type vehicle, and in particular to a cover assembly comprising a housing box for receiving and storing a rollable curtain, said housing box being configured for the rollable curtain to be manually operated by a user and adapted to detachably receive a torsion spring or an electric motor, such that the rollable curtain can be optionally adapted to be semi-automatically or automatically operated.

BACKGROUND

Patent application document WO 90/02056 Al describes a cover assembly for covering an opening comprising an articulated cover, mounted on a pair of tracks, and a housing having a pair of spiral grooves for receiving and storing the cover in a spiral configuration. Patent application document FR 2 824 867 Al describes a roller blind that comprises a shutter comprising a series of mutually articulated laths. Also, FR 2 824 867 Al describes that the shutter is wound and unwound by a driving mechanism connected to the shutter by coupling elements, and there are shutter guide elements for guiding the shutter.

The design and use of retractable roll-up truck bed covers with open bed pickup trucks to provide security and protection for cargo items carried within the truck bed is well known.

Conventional retractable roll-up truck bed covers commonly include a plurality of individual slats hingedly connected to form a slat array. The hinged connection of individual slats enables the slat array to form a continuous cover that, once mounted in a pair of side rails, can be either completely or partially extended or retracted and stored in a rolled-up configuration inside a housing.

There are several types of known roll-up covers. There are roll-up covers manually operated in both directions, with no spring or electric motor, that comprise helical trackways, which cause the cover to assume a substantially rolled position. However, this type of roll-up covers have the disadvantage of not rolling up straight if the user-applied application force is not applied evenly along the width of the cover, causing the cover to be crooked. Also, this type of roll-up covers cannot be converted to a spring or electric motor assisted cover.

There are also roll-up covers with a spring-loaded shaft which aids the user upon winding of the curtain. The function of this type of roll up covers is absolutely associated with the spring, such that in case of spring failure the roll-up covers cannot be operated. Also, this type of roll-up covers cannot be converted to manual or electric motor version of the cover.

Further, there are roll-up covers with helical trackways or spring-loaded shafts comprising an electric motor mounted on an auxiliary shaft inside the housing or in a position outside the housing box. In case of an emergency or electric motor failure, there are mechanisms to allow the user to operate the roll up cover manually. However, there still remains the need for the electric motor to be replaced as this roll-up cover cannot be operated manually in the long term. Also, this type of roll-up covers cannot be converted to a manual or spring assisted version of the cover.

Hence, there remains a need for a cover system that can be easily adapted by a user, with no tools or specific knowledge, from a manually operated cover to a spring or an electric motor assisted cover and vice versa, and wherein the spring and/or electric motor can be easily replaced in case of malfunction or failure of the same.

SUMMARY OF THE INVENTION

In accordance with the invention a cover assembly for a pickup truck bed is provided. The cover assembly comprises a rollable curtain formed of a plurality of transverse adjacent panels or slats hingedly linked to one another and guided along channel portions of a pair of side rails adapted to be mounted on upper portions of the side walls of the truck bed.

According to one aspect of the invention, the cover assembly comprises a housing box for receiving and storing the rollable curtain. Said housing comprising a transverse rotatable shaft mounted therein and one or more curtain collapsible engaging means, each mounted to one or more sleeve elements, for transforming the rotational movement of the shaft 6 into a linear motion of the rollable curtain 1, in an evenly distributed manner along the whole width of the rollable curtain.

According to another aspect of the invention, the housing box for storing the rollable curtain has side walls comprising helical trackways to help guide the rollable curtain free of excessive frictional resistance upon extending or retracting the same.

According to yet another aspect of the invention, the rotatable shaft and a clamping system at a side wall of the housing box are adapted to slidably and removably receive a torsion spring-loaded assembly or an electric motor assembly, such that a user can easily turn a manually operated cover assembly into a semi-automated or automated cover assembly and vice versa, with no tools or specific knowledge.

BRIEF DESCRIPTION OF THE DRAWINGS

A more complete understanding of our invention and its advantages will be apparent from the detailed description taken in conjunction with the accompanying drawings in which:

FIG. 6*a* is a perspective view of a cover assembly, showing a torsion spring-loaded assembly according to an embodiment of the invention.

FIG. 6*b* is a detail view of the second end portion of the torsion spring-loaded assembly of FIG. 6*a*.

FIG. 7*a* is a perspective view of a cover assembly, showing an electric motor assembly according to an embodiment of the invention.

FIG. 7*b* is a detail exploded view of the first end portion of the electric motor assembly of FIG. 7*a*.

DETAILED DESCRIPTION OF THE INVENTION

Figure 1:
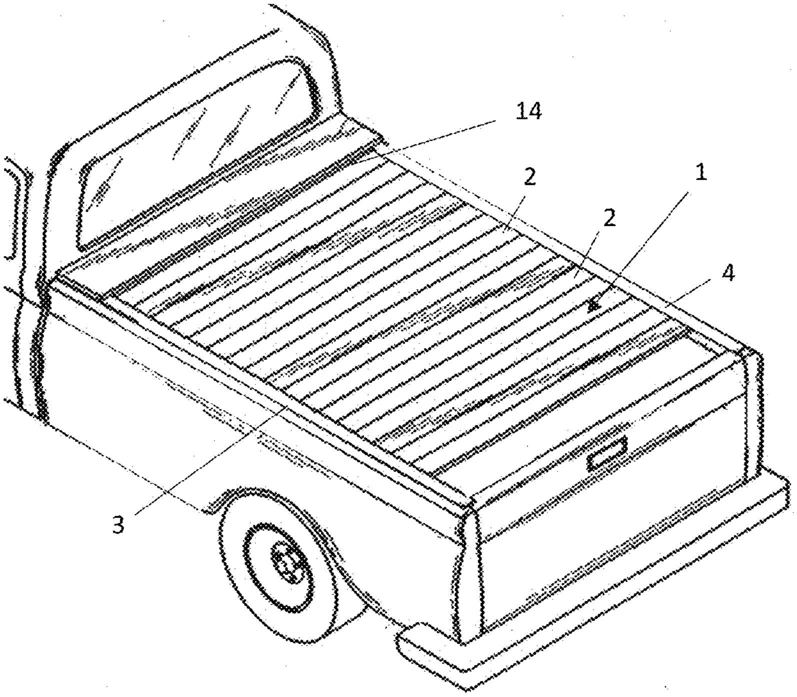
FIG. 1 is a perspective schematic view of a cover assembly in accordance with the invention installed onto a conventional pickup truck bed.

Referring now to the drawings and specifically FIG. 1, the cover assembly of the invention is shown installed upon an existing conventional pickup truck, the rollable curtain 1 comprising a plurality of transverse adjacent panels or slats 2 which extend laterally across the pickup truck bed and are hingedly linked to one another. A pair of side rails 3, 4 are disposed in parallel relation to one another on upper portions of the side walls of the truck bed, respectively, said side rails 3, 4 comprising channel portions for guiding the end portions of the transverse adjacent panels 2.

Figure 2:
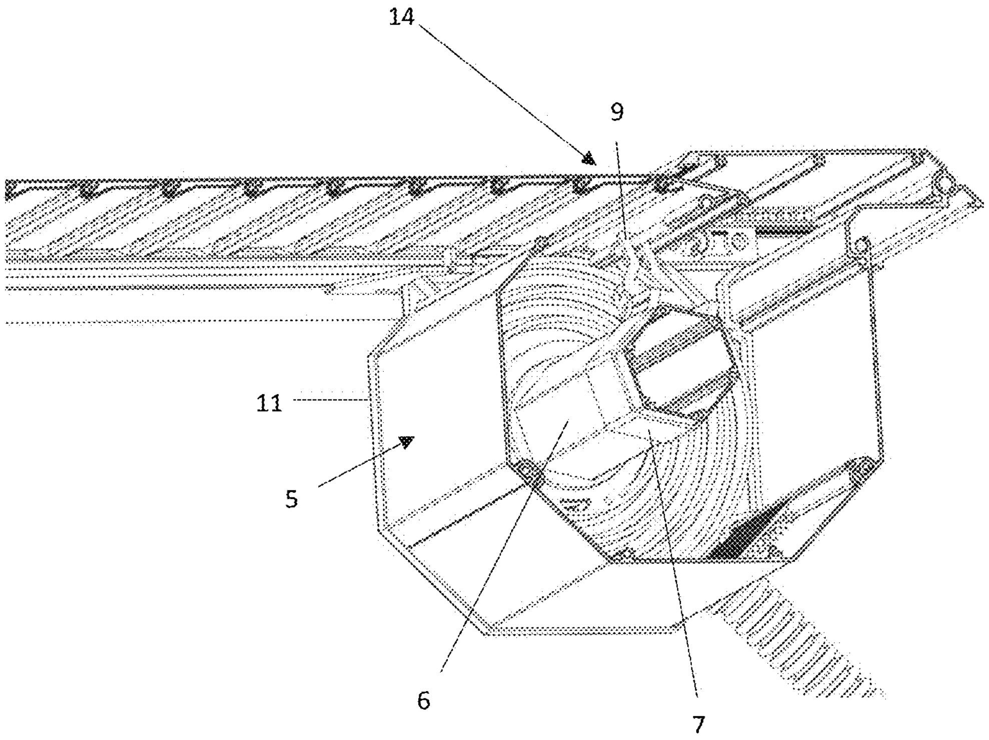
FIG. 2 is a cross sectional side view of a cover assembly in accordance with the invention, wherein the rollable curtain is in a fully extended position.
Figure 3:
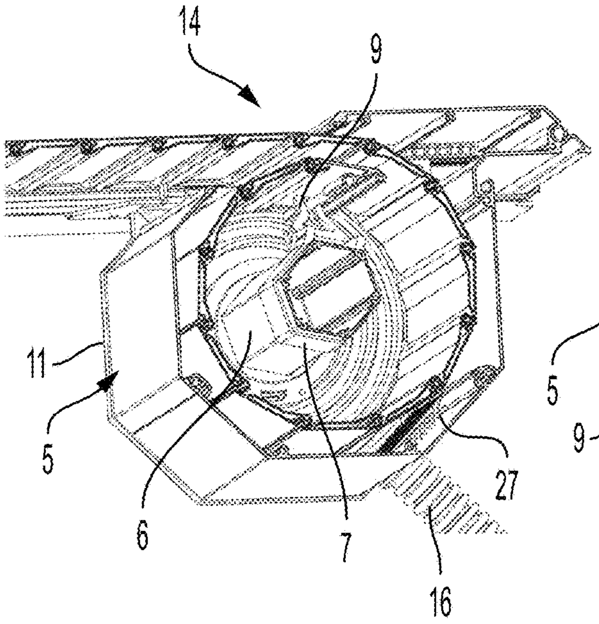
FIG. 3 is a cross sectional side view of a cover assembly in accordance with the invention, wherein the rollable curtain is in a partially extended position.

Referring to FIGS. 2 and 3, a housing box 5 adapted to be mounted at the forward end of the truck bed for receiving and storing the rollable curtain 1, is shown. Said housing box 5 comprising a transverse rotatable shaft 6 mounted therein.

According to an embodiment of the invention, the transverse rotatable shaft 6 has a polygonal shape, for example a hexagonal shape.

One or more sleeve elements 7, 8 are mounted on said transverse rotatable shaft 6 for receiving one or more collapsible curtain engaging means 9, 10, each mounted to said one or more sleeve elements 7, 8, respectively, and designed to engage an inner end of the rollable curtain 1 and to transform the rotational movement of the shaft 6 into a linear motion of the rollable curtain 1.

"Linear" is understood to mean that the rollable curtain describes a line that can be straight or curved.

Said one or more collapsible curtain engaging elements 9, 10 will ride along in engagement with the rollable curtain 1, gradually collapse as the rollable curtain 1 is retracted and gradually rise as the rollable curtain 1 is extended.

Thus, as a user manually guides the rollable curtain 1 towards a retracted or an extended position, the linear motion of the rollable curtain 1 is transformed into a rotational movement of the of the transverse rotatable shaft 6 by means of said one or more collapsible curtain engaging elements 9, 10.

Figure 4:
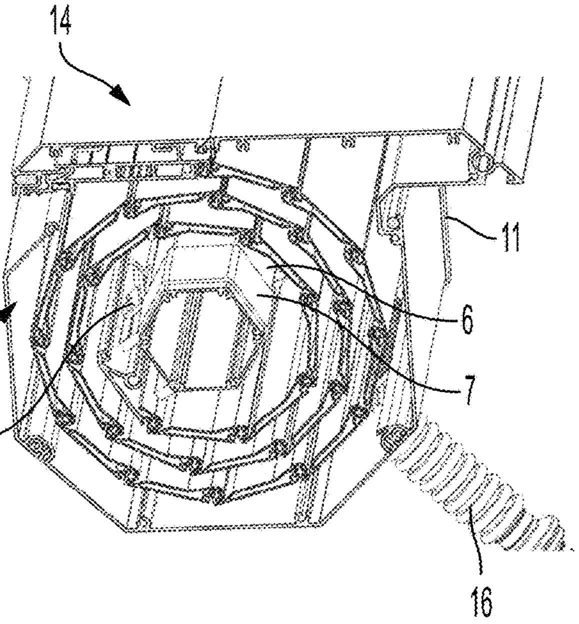
FIG. 4 is a cross sectional side perspective view of the housing box in accordance with the invention, wherein the rollable curtain is in a fully retracted position.

In a preferred embodiment of the present invention, each of the one or more curtain collapsible engaging means 9, 10 is hingedly and slidably mounted to said one or more sleeve elements 7, 8, respectively, such that as the rollable curtain 1 is retracted each of the one or more curtain collapsible engaging means 9, 10 gradually collapses and gradually slides along a groove provided on each of the one or more sleeve elements 7, 8 until reaching a totally collapsed position when the rollable curtain 1 is in a fully retracted position, as shown in FIG. 4, and such that as the rollable curtain 1 is extended each of the one or more curtain collapsible elements 9, 10 gradually rises and gradually slides in the opposite direction until reaching a totally raised position when the rollable curtain 1 is in a fully extended position, as shown in FIG. 2.

Figure 5:
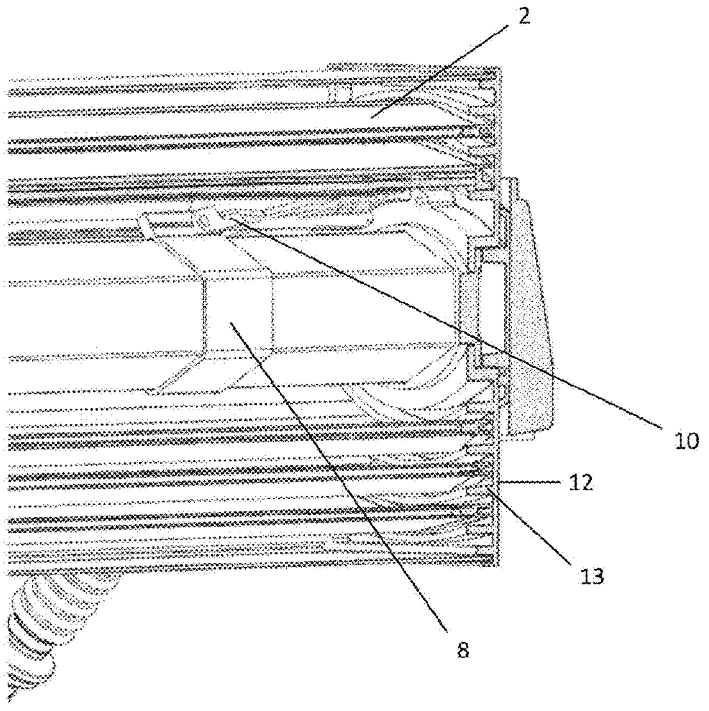
FIG. 5 is a cross sectional front view of the housing box in accordance with the invention, wherein the rollable curtain is in a fully retracted position.

Referring to FIG. 5, the housing box 5 comprises side walls 11, 12, each having inwardly extending continuous helical trackways 13, as shown in FIG. 5, defining a rolling path, the helical trackways 13 being aligned with the channel portions of the side rails 3, 4 to receive the transverse adjacent panels 2 as they are translated forwardly into a retracted position.

Utilization of the helical trackways 13 to store the cover in a retracted position enables extension and retraction of the cover free of excessive frictional resistance.

At least one of the side walls 11, 12 of the housing box 5 comprises an opening 15.

According to the invention, the housing box 5 further comprises an elongated opening 14, as shown in FIG. 1, in top surface thereof, for the rollable curtain 1 to extend outwardly.

The opening 14 has a sufficient width to accommodate the width of the rollable curtain 1.

The housing box 5 may comprise one or more drainage pipe 16 arranged in the bottom, back or sides of housing box to drain out water and encourage air circulation, to minimize humidity and to avoid corrosion on the rollable curtain 1 while it is stored within housing box 5. Further, one or more anti-leaf system 27 may be present in the inner bottom and/or inner sides of the housing box 5 to prevent blockage of said drainage pipe 16. Additionally, it is also contemplated that the housing box 5 comprises overflow means 28, shown in FIGS. 8 & 9, arranged at each side wall of the housing box.

It is also contemplated that the housing box 5 comprises a water level sensor, not shown.

According to an embodiment of the present invention, the transverse rotatable shaft 6 is hollow and is adapted to, optionally, coaxially, slidably and removably receive a torsion spring-loaded assembly 17 or an electric motor assembly 18, through said opening 15.

The torsion spring-loaded assembly 17 comprises a torsion spring that tightens when the rollable curtain 1 is extended, and loosens upon retraction of the rollable curtain 1.

The torsion spring stores energy during extension of the rollable curtain 1 and releases energy during retraction of the curtain in order to assist the user's operation.

The torsion spring-loaded assembly 17 comprises a torsion spring, a first end section 17*a* comprising drive means 20 designed to internally engage the transverse rotatable shaft 6 for transmitting the torque force from the torsion spring to the transverse rotatable shaft 6, and a second end section 17*b* comprising engaging means 22 designed for engaging the torsion spring-loaded assembly 17 within opening 15. Further, said second end section 17*b* may comprise a polygonal shaped element 26, such that a user, by means of a tool such as a wrench, is able to adjust the torsion spring tension.

When semi-automatically operated, i.e., by means of the torsion spring-loaded assembly 17, the rollable curtain 1 may be manually locked and unlocked by means of a locking mechanism, not shown, provided on an end slat of the rollable curtain 1 to maintain a spring bias when the cover is in an extended position.

In an embodiment, the electric motor assembly 18 comprises an electric motor, a first end section 18*a* comprising drive means 21 designed to internally engage the transverse rotatable shaft 6 for transmitting the rotary force from the electric motor to the transverse rotatable shaft 6, and a second end section 18*b* comprising engaging means 23 designed for engaging the electric motor assembly 18 with the clamping system 24 at the side wall of the housing box.

In a preferred embodiment of the invention, the electric motor is a conventional DC electric motor.

As shown in FIGS. 6*a*, 7*a* and 7*b*, drive means 20, 21 include engagement notches spaced about the outer circumferential surface thereof for inter-engagement with depending portions, designed to be in driving engagement with said gear means 20, 21, arranged on the inner surface of the transverse rotatable shaft 6.

In an embodiment of the present invention, said engagement notches have a tapered shape, generally V-shape, or a U-shape to facilitate disengagement of the electric motor assembly 18 from the rotatable shaft 6 upon failure of the power system.

The external profile of the drive means 20, 21 matches the clamping system 24 at the side wall of the housing box, such that a user can easily introduce the torsion spring-loaded assembly 17 or the electric motor assembly 18 through the opening 15 into the transverse rotatable shaft 6.

In operation, the cover assembly of the present invention, when comprising the electric motor assembly 18, is electrically operable to be moved between extended, semi-extended and retracted positions. The rollable curtain 1 can be stopped and locked at any spot by means of an auto locking mechanism.

The drive means 21 is connected with the electric motor means by means of a gear comprised within the first section 18*a*, as shown in FIG. 7*b*, so that said first end section 18*a* is rotatable in a first direction of rotation, upon an "unwinding" actuation of the motor. The first end section 18*a* is rotatable in a second direction of rotation opposite the first direction, upon a "winding" actuation of the electric motor.

In contemplated embodiments of the present invention, the drive means 21 may be removable from said first section 18*a* such they can disengage from the electric motor assembly 18 and remain inside the shaft 6.

Figure 12:
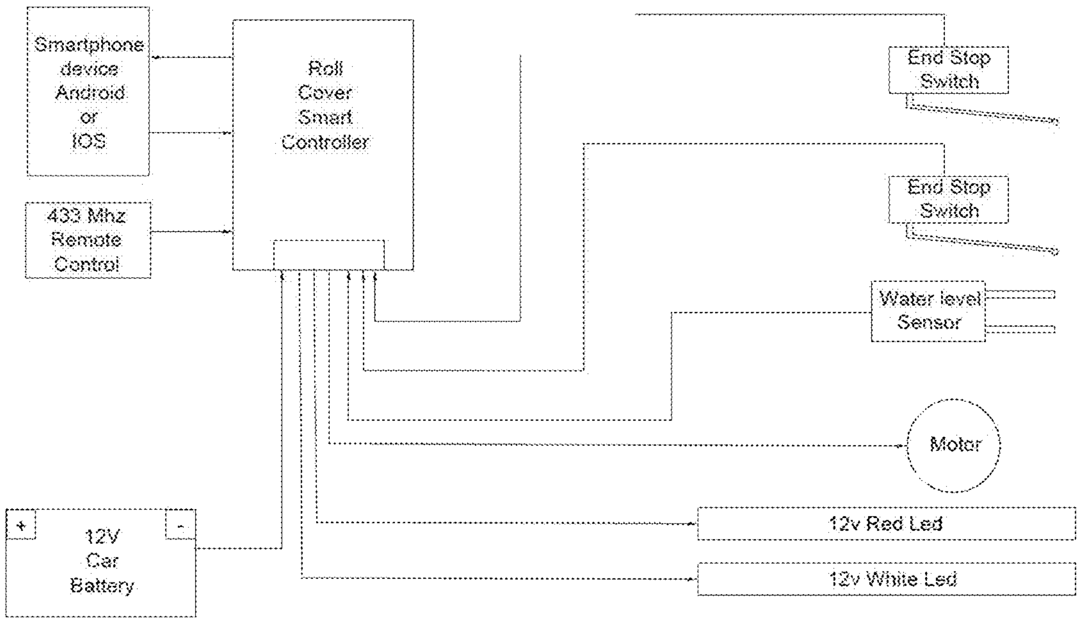
FIG. 12 shows a wiring diagram of the cover assembly according to an embodiment of the invention.

The electric motor is driven by a smart-Al control circuit board 19 mounted on a side wall 11,12 of the housing box 5, as shown in FIG. 12. Said smart-Al controller circuit board 19 is preferably connected to the vehicle battery.

A control panel means, not shown, may be mounted on or adjacent the housing box 5 and/or in the truck cab and/or in the side rails and/or in the end slat.

The electric motor assembly 18 may be remotely controlled by a remote controller or an app installed in a smartphone. Additionally, or alternatively, the electric motor may be operated by an actuator incorporated at the end slat. The rollable curtain 1 can thus be opened, closed, stopped and/or locked automatically at any spot.

Figure 8:
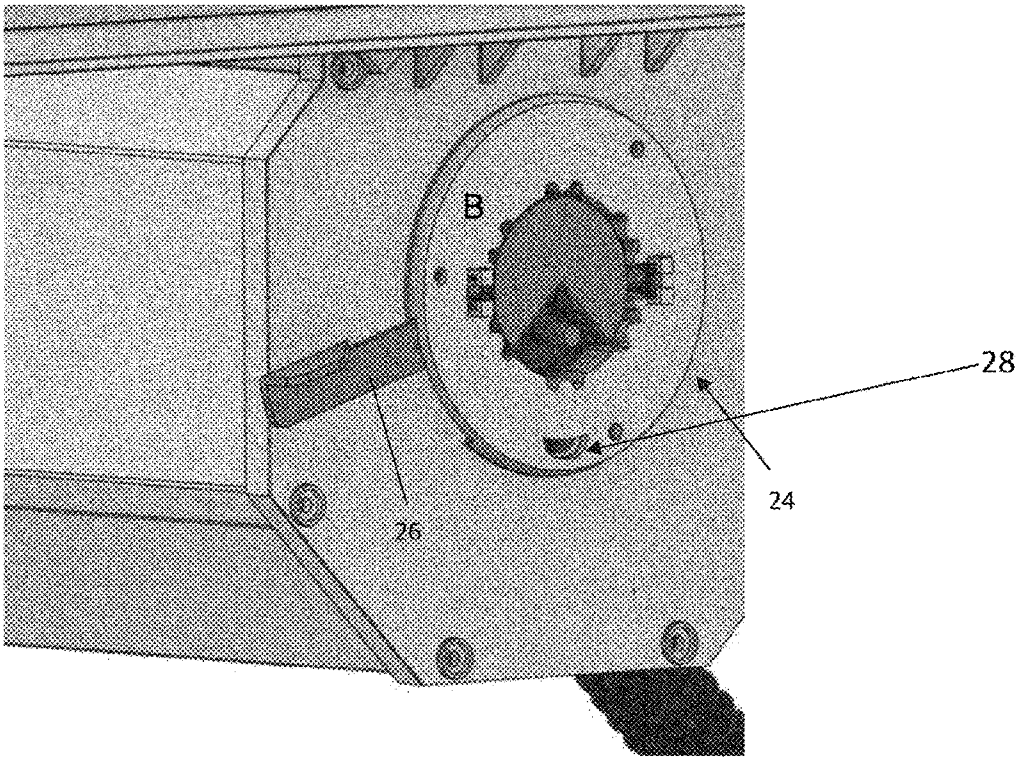
FIG. 8 is a perspective view showing the retaining mechanism of the housing box in an unlocked arrangement, when comprising a torsion spring-loaded assembly or an electric motor assembly according to embodiments of the invention.
Figure 9:
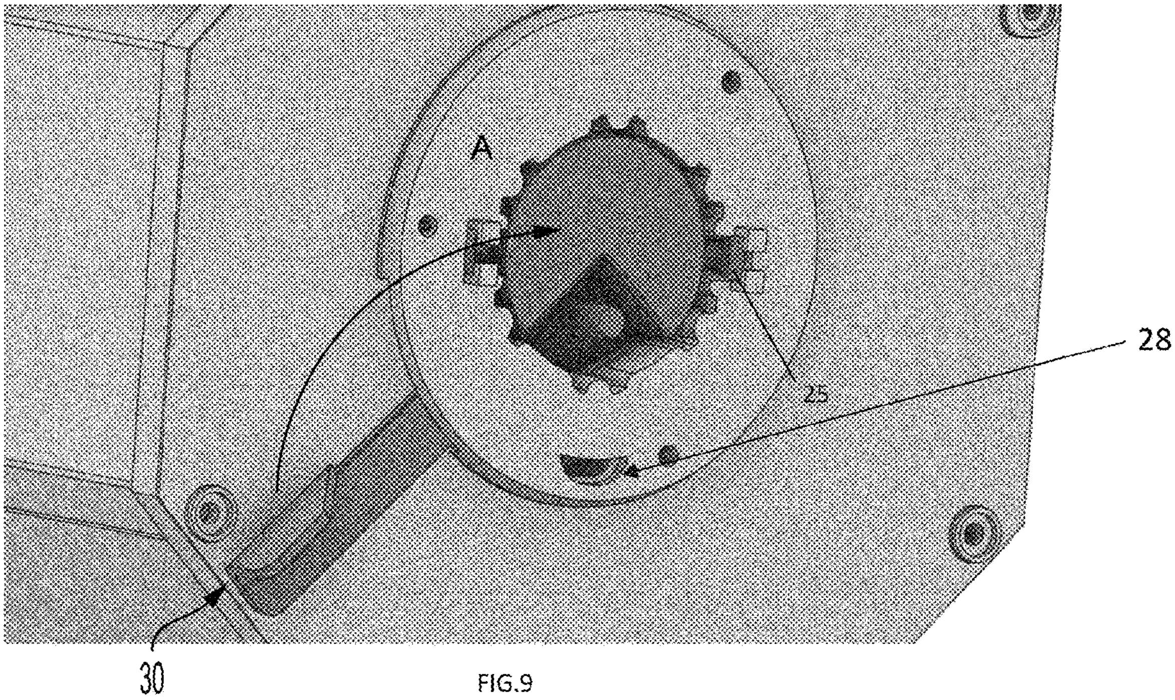
FIG. 9 is a perspective view showing the retaining mechanism of the housing box in a locked arrangement, when comprising a torsion spring-loaded assembly or an electric motor assembly according to embodiments of the invention.
Figure 10:
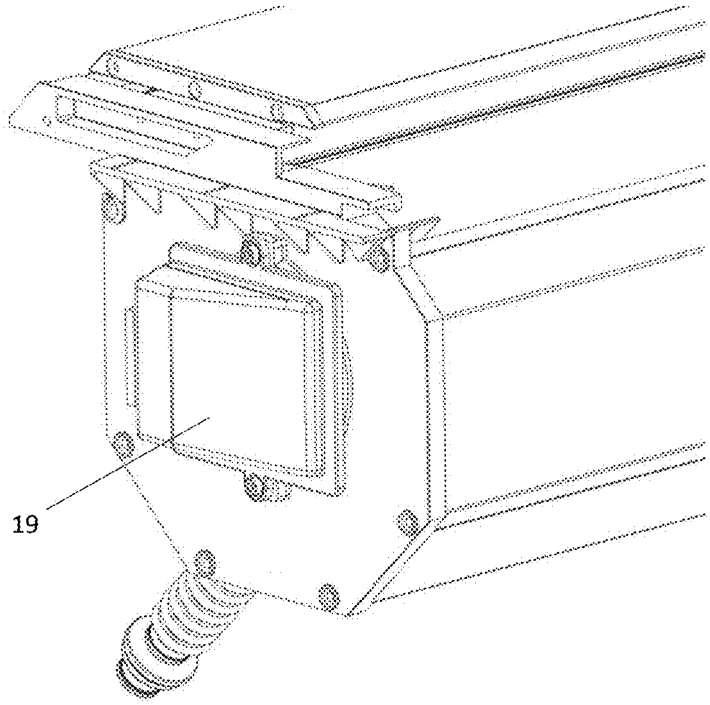
FIG. 10 is a side perspective view of the housing box according to an embodiment of the present invention.

Referring now to FIGS. 8 and 9, the cover assembly provides manual engagement and disengagement of the torsion spring-loaded assembly 17 or the electric motor assembly 18 by a user.

One side wall 11, 12 of the housing box 5 includes a clamping system 24 comprising a retaining member 25, that is selectively movable between a first position A in which a retaining member blocks removal of the torsion spring-loaded assembly 17 or the electric motor assembly 18, more specifically blocks the engaging means 22, 23 of the torsion spring-loaded assembly 17 or the electric motor assembly 18, respectively, as shown in FIG. 9, and a second position B in which the retaining member does not block removal of the spring-loaded assembly 17 or the electric motor 18 assembly, as shown in FIG. 8. The retaining member 25 is selectively movable by means of a manual actuator 26, such that a user can easily engage/disengage the torsion spring-loaded assembly 17 or the electric motor assembly 18 without the need of tools or special knowledge.

In one embodiment of the invention, as shown in FIG. 9, the manual actuator is a lever 26.

Constructional elements of the electric motor assembly 18 and spring-loaded assembly 17 in combination with the configuration or design of the shaft 6 and opening 15 result in a sealed system once the electric motor assembly 18 or spring-loaded assembly 17 is inserted in the opening 15 and locked by means of said retaining member.

Figure 11:
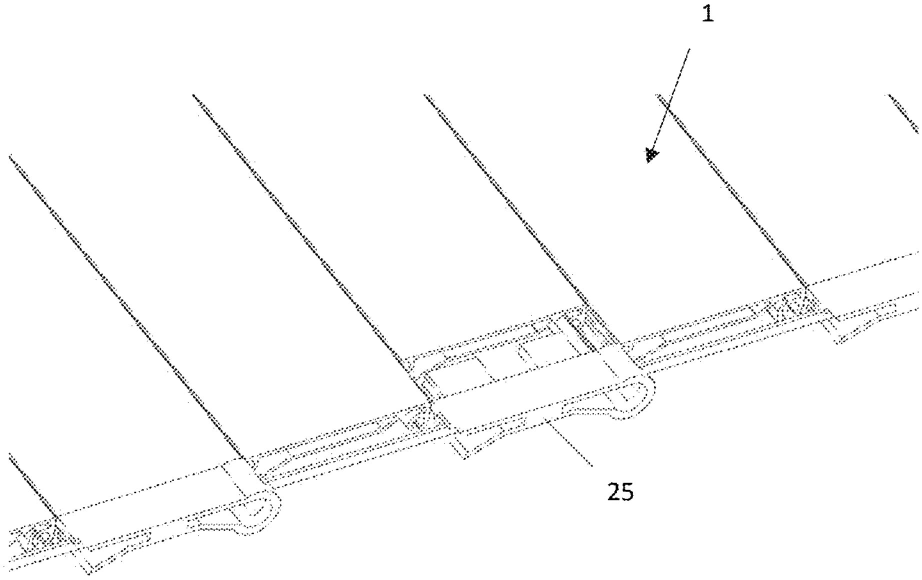
FIG. 11 is a partial top perspective view of the rollable curtain according to an embodiment of the present invention.

In any of the embodiments of the invention, the cover assembly may comprise a plurality of cable guiding elements, as shown in FIG. 11, mounted to at least part of the plurality of adjacent transverse panels 2 and configured to receive cable wires therethrough for providing a wired connection to the cover assembly.

The cover assembly of the invention may further comprise a plurality of electric elements arranged on the transverse panels or slats 2, including an end slat, such as light elements or sensors means connected by means of said wired connection. Said electric elements may be remotely controlled, as shown in FIG. 11.

While the embodiments have been described in detail in the description, the same is to be considered illustrative and not restrictive in character, being understood that it would be obvious to those skilled in the art that various other changes and modifications may be made without departing from the scope of the disclosure.

The invention claimed is:

1. A cover assembly for a truck bed of a pick-up type vehicle, the cover assembly comprising: a rollable curtain comprising a plurality of transverse adjacent panels hingedly linked to one another and configured to be translated forwardly into a retracted position; a pair of side rails adapted to be mounted on upper portions of side walls of the truck bed and comprising guiding channels for guiding end portions of the transverse adjacent panels; a housing box adapted to be mounted at a forward end of the truck bed for receiving and storing the rollable curtain, wherein the housing box comprises: a transverse rotatable shaft mounted within the housing box; one or more sleeve elements mounted on the transverse rotatable shaft; one or more collapsible curtain engaging means each mounted to the one or more sleeve elements, respectively, for engaging an inner end of the rollable curtain and for transforming the rotational movement of the transverse rotatable shaft into a linear motion of the rollable curtain; and side walls, each having inwardly extending continuous helical trackways defining a rolling path, the helical trackways being aligned with the guiding channels of the side rails to receive the transverse adjacent panels as the transverse adjacent panels are translated forwardly into the retracted position; wherein the one or more collapsible curtain engaging means comprise a sliding hinge which connects the plurality of transverse adjacent panels to the one or more sleeve elements.

2. The cover assembly according to claim 1, wherein at least one of the side walls of the housing box comprises an opening.

3. The cover assembly according to claim 1, wherein the transverse rotatable shaft has a polygonal shape.

4. The cover assembly according to claim 1, wherein the transverse rotatable shaft is hollow.

5. The cover assembly according to claim 1, wherein the transverse rotatable shaft is adapted to slideably and removably receive a torsion spring-loaded assembly which connects to a side wall of the housing box by a clamp.

6. The cover assembly according to claim 1, further comprising a torsion spring-loaded assembly.

7. The cover assembly according to claim 1, wherein the transverse rotatable shaft is adapted to slideably and removably receive an electric motor assembly which connects to a side wall of the housing box by a clamp.

8. The cover assembly according to claim 1, further comprising an electric motor assembly.

9. The cover assembly according to claim 8, wherein the electric motor assembly is configured to be driven by a smart-AI controller circuit board mounted on the housing box.

10. The cover assembly according to claim 8, wherein the electric motor assembly is configured to be remotely controlled by means of a smart-AT controller circuit board.

11. The cover assembly according to claim 8, wherein the electric motor assembly is configured to be remotely controlled by a remote controller or an app installed in a smartphone.

12. The cover assembly according to claim 8, further comprising a torsion spring-loaded assembly; and wherein the torsion spring-loaded assembly and the electric motor assembly comprise drive means, mounted for rotation, for internally engaging the transverse rotatable shaft.

13. The cover assembly according to claim 8, further comprising a torsion spring-loaded assembly; and wherein the torsion spring-loaded assembly and the electric motor assembly comprise engaging means for engaging a side wall of the housing box.

* * * * *